M. DALY.
GREASE CUP PLUG LOCK.
APPLICATION FILED JUNE 14, 1917.
1,272,229.
Patented July 9, 1918.
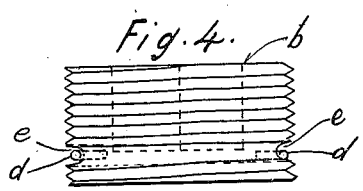
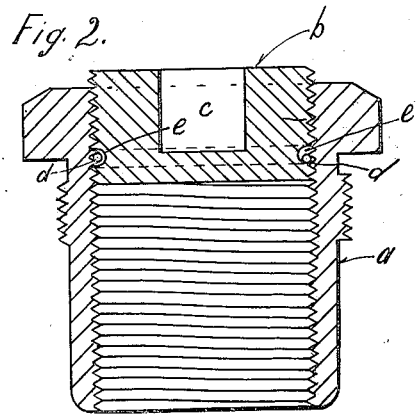
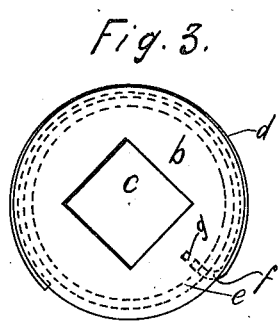
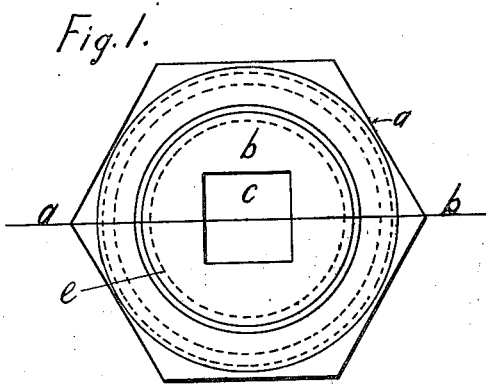
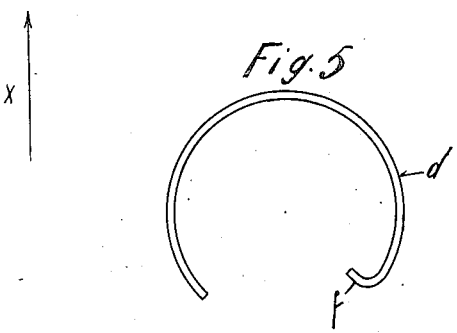

UNITED STATES PATENT OFFICE.

MARK DALY, OF MONCTON, NEW BRUNSWICK, CANADA.

GREASE-CUP-PLUG LOCK.

1,272,229.

Specification of Letters Patent.

Patented July 9, 1918.

Application filed June 14, 1917. Serial No. 174,784.

*To all whom it may concern:*

Be it known that I, MARK DALY, a British subject, residing at No. 5 Albert street, in the city of Moncton, in the Province of New Brunswick, in the Dominion of Canada, have invented a new and useful Grease-Cup-Plug Lock, of which the following is a specification.

My invention relates to grease cups which are used for lubricating purposes, and more especially to grease cups which are used on locomotives and automobiles, and the object of my invention is to provide a plug for such grease cups which will not become displaced by working outward by the vibration of the machine to which it is attached, but can only be removed by applied force either by a wrench or otherwise.

I attain this object by the mechanism illustrated in the accompanying drawing, in which—

Figure 1 is a plan of a grease cup with a plug in place embodying my invention. Fig. 2 is a section of Fig. 1 on line *a b*. Fig. 3 is a plan of the plug separated from the cup. Fig. 4 is an elevation of Fig. 3 looking in the direction indicated by the arrow *x*. Fig. 5 is a plan view of the lock detached from the plug by which it is entirely supported.

Similar letters refer to similar parts throughout the several views.

In the drawing *a* is the grease cup, which is preferably made of brass and is secured into a connecting rod or other receptacle; *b* is the plug which is also preferably made of brass and is threaded into the said grease cup; *c* is a wrench socket; *d* is a single wire circular spring of a length less than the circumference of said plug, and of a diameter slightly greater than that of the same and lies in a round bottomed groove, slightly deeper and wider than the diameter of said spring wire, which groove completely encircles said plug near its entrance to the said cup and parallel to the face of the same; *f* is a portion of said spring which is bent for insertion into the recess *g* in the bottom of said groove.

The operation of my invention is as follows: The bent end of the spring being inserted in the recess *g*, it is then coiled around in the groove in the plug near its entrance to the cup in a direction opposite to that in which the plug moves while being screwed in, said plug will meet with little resistance from said spring in its forward movement on account of the advance end of the spring being held in the said recess *g*, while the opposite end is comparatively free and will easily accommodate itself to its position between the threads, but when the plug is turned in its backward or outward movement, the comparative free end of the spring then becomes the advance end and its free end being in frictional contact with the threads of the plug and cup the result is that the spring will be kinked or buckled and wedged between the said threads of the plug and cup, and the friction is so increased that increased force will be required to operate it.

Having described and illustrated my invention, what I claim and desire to secure by Patent is:—

1. In combination a grease cup of the class described, a plug having threaded connection with the interior of said cup, a groove surrounding the exterior of said plug, adapted to the reception of a wire spring, a wire spring partially occupying said groove and held by its advance end during the forward motion of said plug, and adapted to a buckling and wedging movement between the threads in contact on its backward or return movement; substantially as described.

2. In combination, a grease cup of the class described, a plug having threaded connection with the interior of said cup, a groove surrounding the exterior of said plug near its entrance to said cup, a wire spring partially occupying said groove and held by its advance end during the forward motion of said plug, and in the reverse motion of said plug adapted to a buckling and wedging motion between the said threads in contact, with an external central recess adapted to the reception of an operating wrench; substantially as described, and for the purpose specified.

MARK DALY.

Witnesses:
T. T. GOODWIN,
F. J. SWEENEY.